United States Patent
Nomura et al.

(10) Patent No.: US 6,314,798 B2
(45) Date of Patent: Nov. 13, 2001

(54) CUTTING TOOL AND WEAR RESISTANT MATERIAL

(75) Inventors: Makoto Nomura, Komaki; Hideki Kato, Aichi; Hiroshi Yoshida, Gifu, all of (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/841,591

(22) Filed: Apr. 25, 2001

Related U.S. Application Data

(62) Division of application No. 09/532,458, filed on Mar. 23, 2000.

(30) Foreign Application Priority Data

Mar. 24, 1999 (JP) .................................................. 11-79898

(51) Int. Cl.⁷ .............................. G01N 3/48; B23Q 17/20
(52) U.S. Cl. ...................................................... 73/81; 73/78
(58) Field of Search ................................ 73/78, 104, 105, 73/81, 1.89

(56) References Cited

U.S. PATENT DOCUMENTS

| | | |
|---|---|---|
| 5,382,273 | 1/1995 | Mehrotra et al. . |
| 5,525,134 | 6/1996 | Mehrotra et al. . |

FOREIGN PATENT DOCUMENTS

| | | |
|---|---|---|
| 8-503664 | 4/1996 | (JP) . |
| WO 94/16023 | 7/1994 | (WO) . |

OTHER PUBLICATIONS

S. A Shevchuk et al, Rapid Determinations of the Microhardness of Pearlite in Gray Cast Iron with a Small Number of Indentations 1971, Consultants Bureau, Penum Publishing Corporation, vol. 37, No. 2 pp284–286.*

H H Racke Th Fett, Determination of hardness distribution beneath a test piece surface by Vickers hardness measurements at a number of load leves 1975, Publisher: VDI Verlag GmbH, vol. 17. No. 12, pp 426–430.*

* cited by examiner

Primary Examiner—Hezron Williams
Assistant Examiner—Katina Wilson
(74) Attorney, Agent, or Firm—Sughrue, Mion, Zinn, Macpeak & Seas, PLLC

(57) ABSTRACT

Cutting tools and wear-resistant materials formed of a silicon-nitride-based sintered body having excellent characteristics, such as high wear resistance. Cutting tool 1 is in the form of a negative chip having a shape prescribed by ISO standard: SNGN 120408. Specifically, the cutting tool 1 is a chip of a rectangular parallelepiped shape which has a thickness of 4.76 mm and in which each of four sides (cutting edges) 5 on a rake face 3 side has a length of 12.7 mm. In the region having a width of 0.2 mm or less and extending from the cutting edges 5 of the cutting tool 1, the cutting tool 1 has a microhardness H. Plast of 21.2 GPa or greater and a microhardness HU of 11.2 GPa or greater. The Vickers hardness of the cutting tool 1 as measured at a substantial center of the rake face 3 is 14.5 GPa or greater. Further, the amount of oxygen within the cutting tool 1 is 1.0 to 2.0 wt. %. Also disclosed is a method of quality control of an article having a surface, at least a portion of which is curved, which includes measuring one or both of microhardness H. Plast and microhardness HU in the vicinity of the curved portion of the surface, and either accepting or rejecting the article based on the measurement values.

10 Claims, 3 Drawing Sheets

We: ELASTIC ENERGY
Wr: PLASTIC ENERGY

CUTTING TOOL AND WEAR RESISTANT MATERIAL

This is a divisional of application Ser. No. 09/532,458 (Confirmation No. Unassigned) filed Mar. 23, 2000, the disclosure of which is incorporated herein by reference.

BACKGROUND OF THE INVENTION

1. Field of the Invention

The present invention relates to cutting tools and wear-resistant materials, such as bearing balls, which are formed of silicon-nitride-based sintered bodies.

2. Description of the Related Art

Conventionally, silicon nitride sintered bodies, which contain as a main component silicon nitride and have excellent strength, are used for cutting tools and wear-resistant parts (wear-resistant materials) such as bearing balls.

Recently, there has been proposed a technique for improving the wear resistance of a silicon-nitride sintered body used as a cutting tool, through a reduction in the amount of a sintering aide (a certain type of oxide) added to the main component thereof (see Japanese Kohyo (PCT) Patent Publication No. 8-503664).

Separately, in order to realize a cutting tool having high wear resistance, the present inventors have studied a technique for controlling the hardness of a cutting tool in the vicinity of its cutting edge. However, conventionally, such control is not performed in practice.

Conventionally, when the Vickers hardness of a cutting tool is measured, an indentor is pressed against a substantially central portion of the rake face of the cutting tool in order to measure the hardness, and the hardness of the cutting tool in the vicinity of the cutting edge is not measured. This is because, since measurement of Vickers hardness requires some area, accurate measurement of the hardness of a cutting tool in the vicinity of the cutting edge has been impossible.

SUMMARY OF THE INVENTION

The present invention addresses the above-described problems, and an object of the present invention is to provide cutting tools and wear-resistant materials which are formed of a silicon-nitride-based sintered body having excellent characteristics, such as high wear resistance, and a quality control method therefor.

The silicon-nitride-based sintered body or ceramic preferably contains silicon nitride in an amount of 50–99 wt. % and one or more other ceramics such as alumina, magnesia and yttria in an amount of 1–50 wt. %.

a) In the present invention, universal hardnesses of cutting tools and wear-resistant materials are measured through a so-called universal hardness test.

As shown in FIG. 1, in the universal hardness test, a load (test load) is applied onto an indentor in order to indent a sample surface. While this state (i.e., a state in which the indentor press-intrudes into the sample surface) is maintained, the depth of a resultant depression (depth of intrusion) is measured. The hardness of the sample is determined on the basis of the test load and the depth of intrusion.

The term "hardness" is defined as "resistance of a certain object against penetration of another, harder object." The universal hardness test enables accurate measurement of hardness in which elastic deformation is taken into consideration, even for a material which undergoes a relatively large degree of elastic deformation.

That is, the universal hardness test is less likely to involve human errors as compared with a conventional method in which an indentor is pressed into a sample surface and is then removed, after which a resultant depression is observed under a microscope so as to obtain a hardness.

Further, the universal hardness test enables measurement of hardness of a sample in a smaller region, as compared with a conventional method for measurement of Vickers hardness.

b) Values of microhardness used in relation to the present invention are those obtained through a universal hardness test which is prescribed in German standard DIN 50359-1.

That is, hardness HU in the present invention is the universal microhardness HU measured through the above-described universal hardness test, and the microhardness H. Plast is called a universal plastic hardness.

(1) Among the two kinds of hardness, the universal hardness HU, as represented by the following equation (1), is a value [N/mm$^2$] obtained through division of a test force F [N] by an area (=indentor surface area) A(t) [mm$^2$] calculated from an intrusion depth t [mm] under application of the test force F.

Universal hardness HU=Test load F/Indentor surface area A(t) (1)

Since the tip end of an indentor is formed into a quadrangular pyramidal shape having an inter-surface angle α of 136°, the indentor surface area A(t) is calculated from the intrusion depth (t) by the following equation (2), in which the geometry of the indentor is taken into consideration.

$$A(t) = 4 \cdot \{\sin(\alpha/2)/\cos^2(\alpha/2)\} \cdot t^2 \qquad (2)$$

$$= 26.43 \cdot t^2$$

Accordingly, once a depth (t) to which the sample surface is intruded by the indentor subjected to the test load F is measured, the universal hardness HU is calculated in accordance with the following equation (3) derived from equations (1) and (2).

HU=F/(26.43·t$^2$) (3)

(2) In contrast, the universal plastic hardness H. Plast is a value [N/mm$^2$] obtained by the following equation (4), which corresponds to equation (3) with the intrusion depth t in equation (3) replaced with hr [mm].

H. Plast=F/(26.43·hr$^2$) (4)

where, as shown in FIG. 1, hr is the intersection between the horizontal axis representing intrusion depth and a line tangential to an intrusion depth curve in the case where the test force F is maximum, or Fmax (in a region where the test force is lowered).

(3) In the present invention, the universal hardness HU and the universal plastic hardness H. Plast are values for the case in which the maximum test force (test load) Fmax is 1000 mN. The Vickers hardness (Hv) is a value for the case in which the maximum test force (test load) Fmax is 30 kgf.

According to one aspect, the present invention provides a cutting tool formed of a silicon-nitride-based sintered body, wherein a microhardness H. Plast as measured in the vicinity of a cutting edge of the cutting tool is 21.2 GPa or greater.

Since the microhardness H. Plast in the vicinity of a cutting edge of the cutting tool is 21.2 GPa or greater, the cutting tool is excellent in terms of wear resistance, as is apparent from a test example, which will be described later.

Here, the phrase "in the vicinity of a cutting edge" preferably means a region having a width of 0.2 mm or less and extending from cutting edges—which form the sides of a cutting tool—including nose portions at corners), as indicated by hatching in FIG. 2. This preferred definition will apply to the descriptions hereinafter.

Preferably the microhardness H. Plast as measured in the vicinity of the cutting edge is 22.5 GPa or greater. Since the microhardness H. Plast in the vicinity of the cutting edge of the cutting tool is 22.5 GPa or greater, the cutting tool is more excellent in terms of wear resistance, as is apparent from the test example, which will be described later.

According to another aspect, the present invention provides a cutting tool formed of a silicon-nitride-based sintered body, wherein a microhardness HU as measured in the vicinity of a cutting edge of the cutting tool is 11.2 GPa or greater. Since the microhardness HU in the vicinity of a cutting edge of the cutting tool is 11.2 GPa or greater, the cutting tool is excellent in terms of wear resistance, as is apparent from the test example, which will be described later.

Preferably the microhardness HU as measured in the vicinity of the cutting edge is 11.7 GPa or greater. Since the microhardness HU in the vicinity of the cutting edge of the cutting tool is 11.7 GPa or greater, the cutting tool is more excellent in terms of wear resistance, as is apparent from the test example, which will be described later.

The present invention further provides a cutting tool formed of a silicon-nitride-based sintered body, wherein a microhardness H. Plast as measured in the vicinity of a cutting edge is 21.2 GPa or greater, and a microhardness HU as measured in the vicinity of the cutting edge is 11.2 GPa or greater. Accordingly, the cutting tool is more excellent in terms of wear resistance, as is apparent from the test example, which will be described later.

Preferably the microhardness H. Plast in the vicinity of the cutting edge is 22.5 GPa or greater and the microhardness HU in the vicinity of the cutting edge is 11.7 GPa or greater, in which case the cutting tool is further excellent in terms of wear resistance.

Preferably the cutting tool has a Vickers hardness of 14.5 GPa or greater, which makes the cutting tool excellent in terms of wear resistance, as is apparent from the test example, which will be described later.

Advantageously, when the cutting tool has a Vickers hardness of 15.2 GPa or greater, the cutting tool is more excellent in terms of wear resistance, as is apparent from the test example, which will be described later.

The Vickers hardness is measured at a predetermined location on the cutting tool (e.g., at a central portion of the cutting tool) at which measurement is possible.

Preferably the sintered body contains oxygen in an amount of 1.0 to 2.0 wt. %. Since the amount of oxygen within the sintered body is 1.0 to 2.0 wt. %, the sintered body is in a sufficiently sintered state, so that the cutting tool is excellent in terms of wear resistance, as is apparent from the test example, which will be described later.

Especially, when the amount of oxygen within the sintered body is 1.2 to 1.4 wt. %, the cutting tool is more excellent in terms of wear resistance, as is apparent from the test example, which will be described later.

According to a further aspect, the present invention provides a wear-resistant material which has the same essential features as those of the cutting tool, but whose hardness is measured in the vicinity of a surface, not in the vicinity of the cutting edge. Since the wear-resistance material provides the same effects in relation to wear resistance as those provided by the cutting tool, the description in relation to wear resistance is omitted.

As shown in FIG. 3 showing a cross-sectional view of a bearing ball, which is an example of the wear-resistant material, the phrase "in the vicinity of a surface" preferably means a region having a width of 0.2 mm or less and extending from a surface of the wear-resistant material, which region is hatched with solid lines.

Accordingly, the invention further provides a wear-resistant material formed of a silicon-nitride-based sintered body, wherein a microhardness H. Plast as measured in the vicinity of a surface of the wear-resistant material is 21.2 GPa or greater.

Preferably the microhardness H. Plast as measured in the vicinity of the surface is 22.5 GPa or greater.

A yet further aspect of the invention provides a wear-resistant material formed of a silicon-nitride-based sintered body, wherein a microhardness HU as measured in the vicinity of a surface of the wear-resistant material is 11.2 GPa or greater.

Preferably the microhardness HU as measured in the vicinity of the surface is 11.7 GPa or greater.

Preferably a microhardness H. Plast as measured in the vicinity of a surface is 21.2 GPa or greater, and a microhardness HU as measured in the, vicinity of the surface is 11.2 GPa or greater.

Preferably the wear-resistant material has a Vickers hardness of 14.5 GPa or greater.

Advantageously, when the wear-resistant material has a Vickers hardness of 15.2 GPa or greater, the wear-resistant material is more excellent in terms of wear resistance.

The Vickers hardness is measured at a predetermined location on the wear-resistant material (e.g., at a central portion of a cut surface of the wear-resistant material) at which measurement is possible.

Preferably the sintered body comprising the wear-resistant material contains oxygen in an amount of 1.0 to 2.0 wt. %.

Especially, when the amount of oxygen within the sintered body is 1.2 to 1.4 wt. %, the wear-resistant material is more excellent in terms of wear resistance.

Preferably the wear-resistant material is a bearing ball, a bearing inner race, or a bearing outer race. This exemplifies an application of the wear-resistant material. The bearing ball, bearing inner race, or bearing outer race having the above-described feature is excellent in terms of wear resistance; i.e., is a wear-resistant part having a long service life.

According to a further aspect of the present invention there is provided a method of quality control of an article having a surface, at least a portion of said surface being curved, said method comprising the steps of: measuring the microhardness H. Plast of the article in the vicinity of said curved portion of the surface; determining whether the measured value of said microhardness H. Plast is 21.2 GPa or greater; and accepting the article if the value of said microhardness H. Plast is determined to be 21.2 GPa or greater, or rejecting the article if the value of said microhardness H. Plast is determined to be less than 21.2 GPa.

According to a still further aspect of the present invention there is provided a method of quality control of an article having a surface, at least a portion of said surface being curved, said method comprising the steps of: measuring the microhardness HU of the article in the vicinity of said curved portion of the surface; determining whether the measured value of said microhardness HU is 11.2 GPa or greater; and accepting the article if the value of said microhardness HU is determined to be 11.2 GPa or greater, or rejecting the article if the value of said microhardness HU is determined to be less than 11.2 GPa.

The methods of the invention allow quality control to be performed in respect of articles having curved surfaces, such as with a radius of curvature in the range of from 0.1 mm to 10 mm, such as ceramic bearing balls or the cutting edge of cutting tools, which could not otherwise be measured using the Vickers hardness measuring method.

DESCRIPTION OF THE PREFERRED EMBODIMENTS

Embodiments (examples) of the cutting tool and the wear-resistant material according to the present invention will be described, by way of example only, with reference to the drawings.

EXAMPLE 1

In Example 1, a cutting tool formed of a silicon-nitride-based sintered body is exemplified.

a) First, a cutting tool of the present example will be described.

Figure 4:
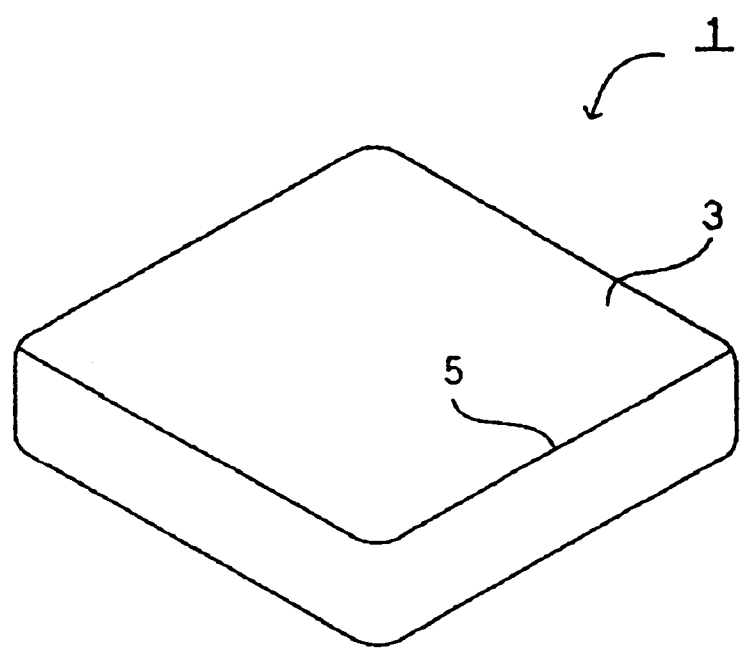
FIG. 4 is a perspective view showing a cutting tool according to Example 1.

As shown in FIG. 4, the cutting tool 1 of the present example is a negative chip having a shape prescribed by ISO standard: SNGN 120408. Specifically, the cutting tool 1 is a chip of a rectangular parallelepiped shape, which has a thickness of 4.76 mm and in which each of four sides (cutting edges) 5 on a rake face 3 side has a length of 12.7 mm.

In the region having a width of 0.2 mm or less and extending from the cutting edges 5 of the cutting tool 1, the cutting tool 1 has a microhardness H. Plast of 21.2 GPa or greater and a microhardness HU of 11.2 GPa or greater. The Vickers hardness of the cutting tool 1 as measured substantially at a center of the rake face 3 is 14.5 GPa or greater. Further, the amount of oxygen within the cutting tool 1 is 1.0 to 2.0 wt. %.

b) Next, a method of producing the cutting tool of the present example will be described.

Silicon nitride ($Si_3N_4$) powder having an average grain size of 1.0 μm or less (oxygen content: 1.3 wt. %); and appropriate amounts of MgO powder, $Al_2O_3$ powder, $Y_2O_3$ powder, $Yb_2O_3$ powder, $Ce_2O_3$ powder, and $ZrO_2$ powder, each having an average grain size of 1.0 μm or less and serving as a sintering aid, are weighed in accordance with compositions A to G shown in Table 1.

TABLE 1

| Composition | Components (wt%) | | | | | | |
|---|---|---|---|---|---|---|---|
| | $Si_3N_4$ | $Al_2O_3$ | MgO | $Y_2O_3$ | $Yb_2O_3$ | $Ce_2O_3$ | $ZrO_2$ |
| A | 98.5 | 0.5 | 1.0 | — | — | — | — |
| B | 97.5 | 0.5 | 1.0 | — | 1.0 | — | — |
| C | 96.0 | 1.0 | 1.0 | — | 2.0 | — | — |
| D | 95.5 | 0.5 | 2.0 | — | — | 1.0 | 1.0 |
| E | 95.0 | 1.0 | 2.0 | 1.0 | — | 0.5 | 0.5 |
| F | 100.0 | — | — | — | — | — | — |
| G | 89.0 | 2.0 | 6.0 | 1.5 | 1.5 | — | — |

Subsequently, by use of balls formed of $Si_3N_4$ and a pot having an inner wall formed of $Si_3N_4$, the weighed materials are mixed in ethanol, serving as a solvent, for 96 hours in order to obtain a slurry.

Subsequently, the slurry is passed through a 325-mesh sieve, and a microwax organic binder dissolved in ethanol is added thereto in an amount of 5.0 wt. %, followed by spray-drying.

Subsequently, the thus-obtained granulated powder is press-formed into a shape as prescribed in ISO standard SNGN 120408, and the thus-obtained compact is heated at an absolute temperature of 873 degrees Kelvin (hereinafter unit for absolute temperature is represented by "K") in a nitrogen atmosphere of 1 atm for 60 minutes for dewaxing.

Subsequently, the compact is subjected to primary sintering, in which the compact is heated for 240 minutes at a temperature of 1973 to 2173 K in a nitrogen atmosphere of 100 to 300 kPa.

Subsequently, the primary-sintered compact is subjected to secondary sintering by HIP (Hot-Isostatic-Pressing). That is, the primary-sintered compact is heated for 120 minutes at a temperature of 1973 to 2023 K in a nitrogen atmosphere of 10 to 100 MPa. Thus, a silicon nitride sintered body is obtained.

Subsequently, the silicon nitride sintered body is polished into the shape prescribed by ISO standard SNGN 120408.

The thus-obtained cutting tool of the present example is a sintered body including silicon nitride grains, a bonding phase, and unavoidable impurities, and has a microhardness H. Plast of 21.2 GPa or greater and a microhardness HU of 11.2 GPa or greater, as measured in the vicinity of the cutting edge. Accordingly, as will be described later, the cutting tool of the present example has excellent properties, such as high wear resistance.

c) Next, a text example performed for confirming the effect of the cutting tool of the present example will be described.

First, sample cutting tool Nos. 1–9 falling within the scope of the present invention were manufactured from the materials shown in Table 1 under the conditions shown in Table 2.

Further, sample cutting tool Nos. 10–12 serving as comparative examples were manufactured from the materials shown in Table 1 under the conditions shown in Table 2.

Calcination (heating for removal of organic binder) was performed at 873 K in a flow of $N_2$. The conditions of the primary firing represent temperature conditions, and the conditions of the second firing represent heating conditions employed during the HIP.

TABLE 2

|  | Sample No. | Composition of material | Primary firing Firing temp. (K) | Secondary firing Firing temp. (K) | Secondary firing Gas pressure (MPa) |
|---|---|---|---|---|---|
| Examples of present invention | 1 | A | 2173 | 1973 | 100 |
|  | 2 | A | 2323 | 1973 | 100 |
|  | 3 | B | 2123 | 1973 | 100 |
|  | 4 | B | 2223 | 1973 | 100 |
|  | 5 | C | 2073 | 1973 | 100 |
|  | 6 | D | 2123 | 2023 | 10 |
|  | 7 | D | 2073 | 2023 | 10 |
|  | 8 | D | 2023 | 2023 | 10 |
|  | 9 | E | 2023 | 2023 | 10 |
| Comparative examples | 10 | F | 2223 | 1973 | 100 |
|  | 11 | G | 2023 | 2023 | 10 |
|  | 12 | E | 2123 | 2023 | 10 |

TABLE 3

|  | Sample No. | H. Plast (GPa) | HU (GPa) | Sintered body oxygen content (wt/%) | Hv (GPa) | $VB_{max}$ (mm) |
|---|---|---|---|---|---|---|
| Examples of present invention | 1 | 25.9 | 12.1 | 1.2 | 15.6 | 0.09 |
|  | 2 | 24.7 | 11.4 | 1.1 | 14.9 | 0.20 |
|  | 3 | 24.5 | 11.8 | 1.3 | 15.3 | 0.11 |
|  | 4 | 23.7 | 11.3 | 1.2 | 14.5 | 0.22 |
|  | 5 | 22.9 | 11.5 | 1.5 | 15.1 | 0.23 |
|  | 6 | 21.5 | 10.7 | 1.5 | 14.1 | 0.38 |
|  | 7 | 21.8 | 10.9 | 1.7 | 14.7 | 0.35 |
|  | 8 | 22.2 | 11.2 | 1.8 | 15.0 | 0.32 |
|  | 9 | 21.2 | 11.0 | 2.0 | 14.8 | 0.41 |
| Comparative Examples | 10 | Not densified | | | | |
|  | 11 | 20.6 | 10.7 | 2.7 | 14.1 | 0.88 |
|  | 12 | 20.9 | 10.9 | 1.9 | 14.2 | 0.71 |

The sample cutting tool Nos. 1 to 12 were subjected to the following measurements and evaluations (1)–(4).

(1) Measurement of Microhardness (H. Plast and HU):

The flank face of each sample was mirror-polished, and the microhardness (H. Plast and HU) of the flank face was measured in the vicinity of a cutting edge in accordance with the procedure of DIN-50359-1. The measurement was performed under the following measurement conditions.

In the present experiment, a super-micro hardness meter (FISCHERSCOPE H-100, product of Fischer) was used.

Indentor pressing maximum load: 1000 mN

Number of steps to reach the maximum load: 100

Holding time at each step: 0.1 sec.

(2) Physical Properties: (Vickers hardness Hv)

Measurement was performed under the following conditions: indentor pressing load: 30 kg; pressing time: 15 sec.

(3) Measurement of Oxygen Content of Sintered Body:

Each sintered body was crushed to particles having a diameter of 1 mm or less, which were then heated and melted in an inert gas. Subsequently, the oxygen content was measured by means of non-dispersive infrared-absorption analysis.

(4) Evaluation of Cutting Performance:

The outer circumferential surface of a cylindrical workpiece of cast iron was dry-cut for 5 minutes under the conditions specified below. Subsequently, flank wear VB at the cutting edge of each tool was measured, and a maximum flank wear ($VB_{max}$) was determined. The flank wear VB is defined as the amount of wear along the flank of the tool tip from the original rake face level at the cutting edge formed at the intersection of the rake face and the flank face, as explained and illustrated in, for example, EP-A-0926110.

Material of workpiece: JIS FC200

Workpiece shape: 240 mm (diameter)×300 mm (length)

Cutting speed: V=300 m/min

Feed rate: f=0.34 mm/rev

Depth of cut: D=1.5 mm

Results of the above-described measurements (1) to (4) are shown below in Table 3.

i) As is apparent from Table 3, each of the sample cutting tool Nos. 1–9 falling within the scope of the invention (having a microhardness H. Plast of 21.2 GPa or greater) exhibits a low maximum flank wear $VB_{max}$ of not greater than 0.41 mm, and is therefore excellent in terms of wear resistance.

Especially, each of the sample cutting tool Nos. 1–5, having a microhardness H. Plast of 22.5 GPa or greater, exhibits a lower maximum flank wear $VB_{max}$ of not greater than 0.23 mm, and is therefore more excellent in terms of wear resistance.

ii) Each of the sample cutting tool Nos. 1–5 and 8, having a microhardness HU of 11.2 GPa or greater, exhibits a low maximum flank wear $VB_{max}$ of not greater than 0.32 mm, and is therefore excellent in terms of wear resistance.

Especially, each of the sample cutting tool Nos. 1 and 3, having a microhardness HU of 11.7 GPa or greater, exhibits a lower maximum flank wear $VB_{max}$ of not greater than 0.11 mm, and is therefore more excellent in terms of wear resistance.

iii) Each of the sample cutting tool Nos. 1–5 and 8, having a microhardness H. Plast of 21.2 GPa or greater and a microhardness HU of 11.2 GPa or greater, exhibits a low maximum flank wear $VB_{max}$ of not greater than 0.32 mm, and is therefore excellent in terms of wear resistance.

In this case, when the microhardness H. Plast is 22.5 GPa or greater or the microhardness HU is 11.7 GPa or greater, the cutting tool is more excellent in terms of wear resistance. Further, when the microhardness H. Plast is 22.5 GPa or greater and the microhardness HU is 11.7 GPa or greater, the cutting tool is further excellent in terms of wear resistance.

iv) Further, each of the sample cutting tool Nos. 1 to 5 and 7 to 9 has a Vickers hardness not less than 14.5 GPa and an oxygen content of 1.0 to 2.0 wt. %, which contribute to improvement of wear resistance.

Especially, cutting tools having a Vickers hardness not less than 15.2 GPa are more excellent in terms of wear resistance than are cutting tools having a Vickers hardness less than 15.2 GPa. Further, cutting tools having an oxygen content of 1.2 to 1.4 wt. % are more excellent in terms of wear resistance than are cutting tools having an oxygen content falling outside the range.

v) Since the sample cutting tool No. 10 serving as a comparative example was not densified sufficiently, evaluation could not be performed. Further, each of the sample cutting tool Nos. 11 and 12 serving as comparative examples has a microhardness H. Plast of not greater than 20.9 GPa and a microhardness HU of not greater than 10.9 GPa. During cutting, each of the sample cutting tool Nos. 11 and 12 exhibits a high maximum flank wear $VB_{max}$ of not less than 0.71 mm, which is abnormal wear and is not preferred.

EXAMPLE 2

Next, Example 2 will be described.

In Example 2, bearing balls will be described as an example of wear-resistant material.

Bearing balls of the present example are ceramic balls containing silicon nitride as a main component. More specifically, the balls contain $Si_3N_4$ (94 wt. %), $Al_2O_3$ (3 wt. %), and $Y_2O_3$ (3 wt. %).

a) First, the structure of a bearing ball of the present example will be described.

The bearing ball of the present example is a ceramic ball containing silicon nitride as a main component. That is, the ball contains 94 wt. % of silicon nitride, 3 wt. % of aluminum oxide, and 3 wt. % of yttrium oxide.

Figure 1:
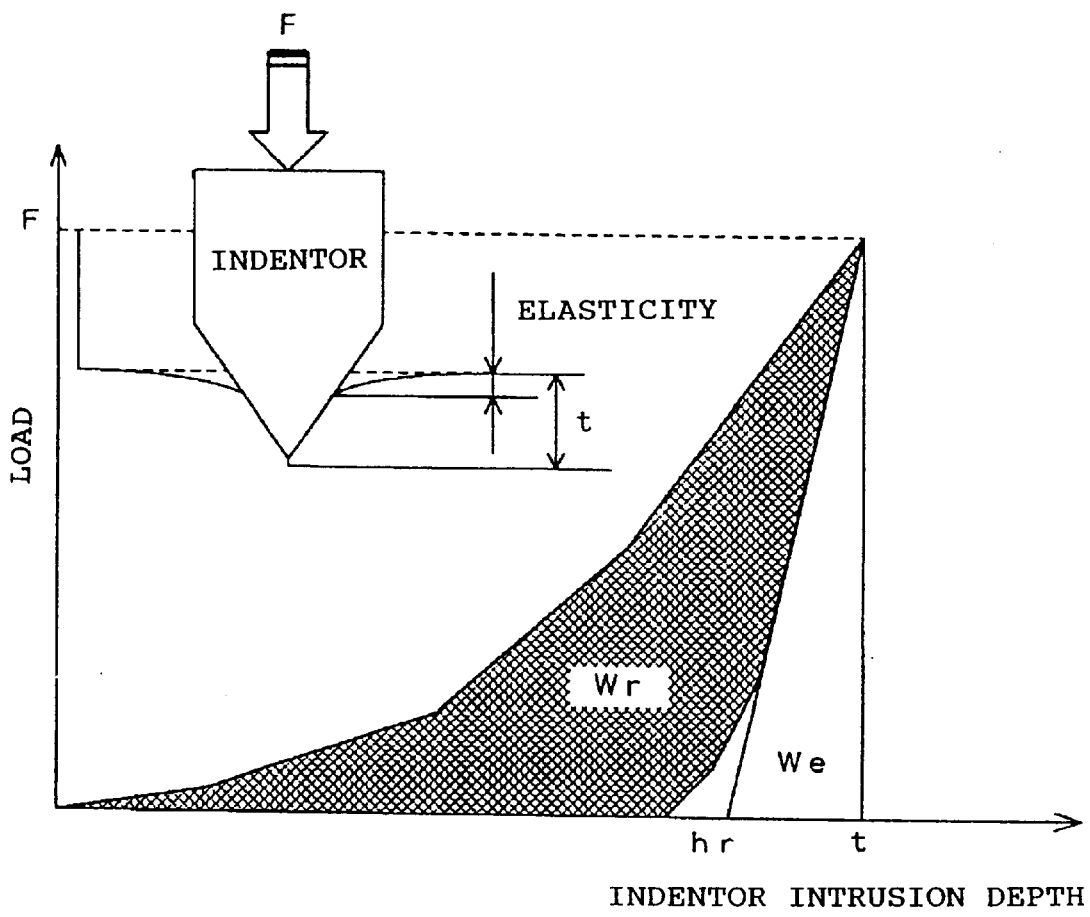
FIG. 1 is an explanatory view showing a universal hardness test.
Figure 2:
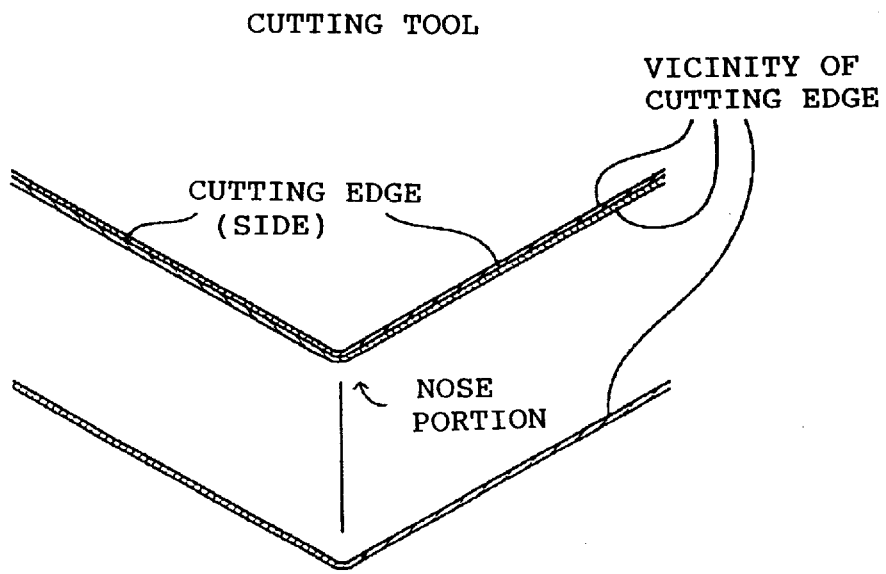
FIG. 2 is an explanatory view showing the vicinity of a cutting edge of a cutting tool.
Figure 3:
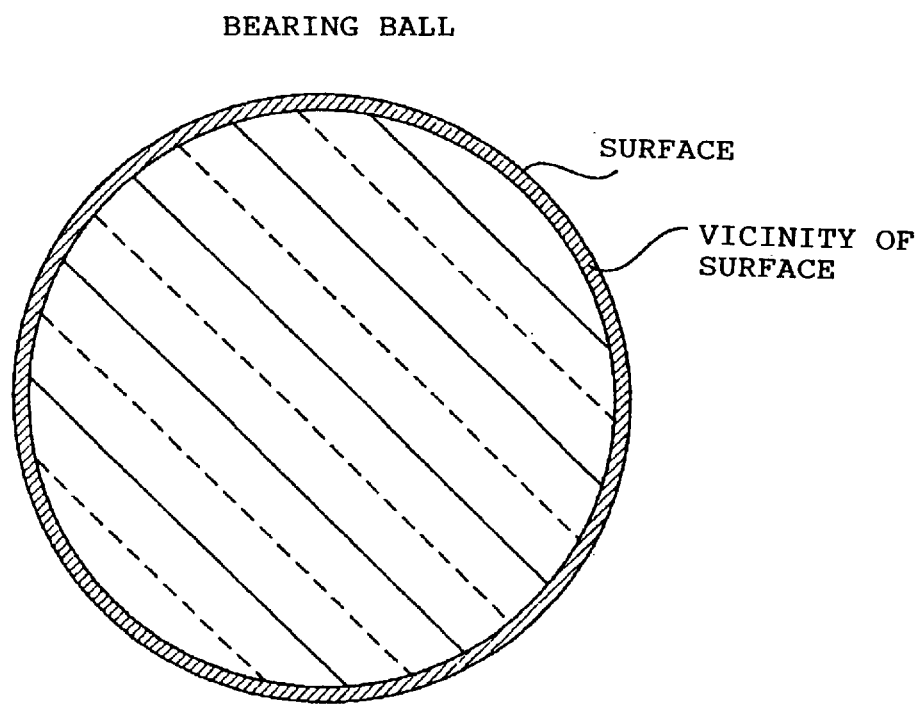
FIG. 3 is an explanatory view showing the vicinity of a surface of a bearing ball.

As shown in FIG. 3, the bearing ball has a true spherical shape having a diameter of, for example, 2 mm, and within the region having a width of 0.2 mm or less and extending from the surface of the bearing ball (in the vicinity of the surface), the bearing ball has a microhardness H. Plast of 21.2 GPa or greater and a microhardness HU of 11.2 GPa or greater.

The Vickers hardness of the bearing ball as measured at a substantial center of the ball is 14.5 GPa or greater. Further, the amount of oxygen within the ceramic ball is 1.0 to 2.0 wt. %.

b) Next, a method of producing the bearing ball will be described.

(1) A material for the ceramic bearing ball is prepared as follows. Silicon nitride powder (100 parts by weight) and powder of a sintering aid (e.g., a mixture of aluminum oxide and yttrium oxide; 1 to 10 parts by weight) are wet-mixed (or wet-mixed and wet-ground) by use of a ball mill or an attriter, while pure water is used as a solvent. Thus, the material is obtained in the form of a slurry.

(2) Subsequently, forming is performed through pressing. In the pressing, material powder is prepared from the slurry by use of a spray dryer, and the material powder is formed into a spherical shape by use of a well known mold press. The thus-obtained spherical compact is sintered by means of gas-pressure sintering or hot-isostatic-press sintering. Thus, a spherical silicon nitride sintered body is obtained.

(3) The thus-obtained sintered body is ground so as to adjust its diameter, sphericity, etc. As a result, a bearing ball of silicon nitride is obtained.

(4) The service life of the bearing ball (having a diameter of, e.g., 3/8 inches) was evaluated by use of a ball bearing life tester (Gakushingata Life Tester, product of Takachiho Seiki, Type "II").

The life evaluation was performed under the following conditions.

A deep groove ball bearing #6206 was used as a test bearing, and a shaft was rotated at a speed of 3000 rpm, while a radial load of 390 kgf was applied. Lubrication was provided in accordance with a gravity drop scheme in which lubrication oil (Terrace Oil #32, product of Showa Shell) was supplied at a rate of 5 cc/min.

As a result, no anomalous state such as exfoliation of a surface layer was observed on the bearing ball after 2000 hours and after 3000 hours.

The test result demonstrates that when components (an inner race, an outer race, etc.) of a bearing are formed from the material powder containing similar components in similar amounts as those of the silicon nitride sintered body of the present example and are fired in a similar manner, bearing components and a bearing having excellent mechanical strength and durability can be obtained.

Since the bearing ball manufactured in the above-described manner has the above-described microhardness and other properties, the bearing ball is excellent in terms of wear resistance.

An embodiment of the method of the present invention is as follows., Cutting tools, bearing balls or other articles having curved surfaces or which have portions of their surface which are curved, particularly curved surfaces with a small radius of curvature, such as a radius of curvature in the range of from 0.1 mm to 10 mm are firstly manufactured. After manufacture, but prior to shipment, each one, or selected representative ones, of a batch of articles are subjected to a quality control test. The microhardness H. Plast in the vicinity of the curved surface of the article, such as in the vicinity of the cutting edge if the article is a cutting tool, is measured as described above. If the value of the measured microhardness H. Plast is determined to be less than 21.2 GPa, the article is rejected as being of a lower standard. Alternatively, or in addition, the value of the microhardness HU in the vicinity of the curved surface of the article is measured as described above. If the value of the measured microhardness HU is determined to be less than 11.2 GPa, the article is also rejected as being of a lower standard. Other properties of the articles described above may be measured and used in quality control evaluation, for example, to determine that article falls within the scope of at least one of the appended claims. Articles or batches of articles which satisfy the quality control criterion or criteria are accepted and can be shipped.

The present invention is not limited to the above-described embodiments, but may be embodied in many other specific forms without departing from the scope of the invention, as defined in the claims.

(1) Although a negative-type chip (having right-angled noses) is exemplified as the cutting tool, the present invention can be applied to a positive-type chip (having acute-angled noses).

(2) Other than bearing balls, examples of the wear-resistant material include inner and outer races of a bearing.

Since the cutting tool of the present invention, which is a silicon-nitride-based sintered body, has a considerably high wear resistance, the cutting tool effectively serves as a tool for high speed cutting and cutting of very hard workpieces.

Similarly, since the wear-resistant material of the present invention, which is a silicon-nitride-based sintered body, has a considerably high wear resistance, it can be applied to various new applications as well as bearing balls.

The method of the present invention is not limited to silicon nitride ceramic articles, but can be applied to articles made of other materials which have curved surfaces or which have portions of their surfaces which are curved. For example, the method of the present invention may be applied to a silicon nitride-based ceramic article and a composite material of silicon nitride, TiC and/or WC. Also, it is expected that the method of the present invention can also be applied to alumina-based ceramic articles and zirconia-based ceramic articles.

This application is based on Japanese Patent Application No. Hei. 11-79898 filed Mar. 24, 1999 which is incorporated herein by reference in its entirety.

What is claimed is:

1. A method of quality control of an article having a surface, at least a portion of said surface being curved, said method comprising the steps of:

measuring the microhardness H. Plast of the article in the vicinity of said curved portion of the surface;

determining whether the measured value of said microhardness H. Plast is 21.2 GPa or greater; and accepting the article if the value of said microhardness H. Plast is determined to be 21.2 GPa or greater, or rejecting the article if the value of said microhardness H. Plast is determined to be less than 21.2 GPa.

2. The method according to claim 1, wherein said curved portion of said surface has a radius of curvature in the range of from 0.1 mm to 10 mm.

3. The method according to claim 1, wherein said article is a cutting tool, and the microhardness H. Plast is measured in the vicinity of the cutting edge of the cutting tool.

4. The method according to claim 1, wherein said article is a bearing ball, a bearing inner race, or a bearing outer race.

5. The method according to claim 1, wherein said article comprises a silicon-nitride-based sintered body.

6. A method of quality control of an article having a surface, at least a portion of said surface being curved, said method comprising the steps of:

measuring the microhardness HU of the article in the vicinity of said curved portion of the surface;

determining whether the measured value of said microhardness HU is 11.2 GPa or greater; and accepting the article if the value of said microhardness HU is determined to be 11.2 GPa or greater, or rejecting the article if the value of said microhardness HU is determined to be less than 11.2 GPa.

7. The method according to claim 6, wherein said curved portion of said surface has a radius of curvature in the range of from 0.1 mm to 10 mm.

8. The method according to claim 6, wherein said article is a cutting tool, and the microhardness HU is measured in the vicinity of the cutting edge of the cutting tool.

9. The method according to claim 6, wherein said article is a bearing ball, a bearing inner race, or a bearing outer race.

10. The method according to claim 6, wherein said article comprises a silicon-nitride-based sintered body.

* * * * *